US012155942B2

(12) United States Patent
Matsumoto

(10) Patent No.: US 12,155,942 B2
(45) Date of Patent: Nov. 26, 2024

(54) IMAGE CAPTURING APPARATUS FOR PHOTOMETRY, CONTROL METHOD, AND STORAGE MEDIUM

(71) Applicant: CANON KABUSHIKI KAISHA, Tokyo (JP)

(72) Inventor: Yukihiro Matsumoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 17/937,716

(22) Filed: Oct. 3, 2022

(65) Prior Publication Data
US 2023/0106750 A1    Apr. 6, 2023

(30) Foreign Application Priority Data

Oct. 4, 2021  (JP) .................. 2021-163592

(51) Int. Cl.
| | |
|---|---|
| *H04N 23/959* | (2023.01) |
| *G01J 1/42* | (2006.01) |
| *G03B 17/14* | (2021.01) |
| *H04N 23/55* | (2023.01) |
| *H04N 23/63* | (2023.01) |
| *H04N 23/667* | (2023.01) |

(52) U.S. Cl.
CPC .............. *H04N 23/959* (2023.01); *G01J 1/42* (2013.01); *G03B 17/14* (2013.01); *H04N 23/55* (2023.01); *H04N 23/632* (2023.01); *H04N 23/667* (2023.01)

(58) Field of Classification Search
None
See application file for complete search history.

(56) References Cited

U.S. PATENT DOCUMENTS

| | | | | |
|---|---|---|---|---|
| 2012/0249857 | A1* | 10/2012 | Lee ................. | G02B 7/102 |
| | | | | 348/E5.024 |
| 2013/0088580 | A1* | 4/2013 | Ikeda ................ | G03B 35/10 |
| | | | | 348/241 |

FOREIGN PATENT DOCUMENTS

JP        2001-188310 A     7/2001

* cited by examiner

*Primary Examiner* — Rebecca A Volentine
(74) *Attorney, Agent, or Firm* — Canon U.S.A., Inc. IP Division

(57) ABSTRACT

An image capturing apparatus includes a first interchangeable lens and a second interchangeable lens different from the first interchangeable lens. The second interchangeable lens includes a first optical unit and a second optical unit guiding a light flux from a subject to an image capturing unit through respective optical paths. The image capturing apparatus includes a photometry unit and a control unit configured to perform control to display an enlargement frame on a display unit. In a state where the second interchangeable lens is mounted on the image capturing apparatus, the control unit performs control to superimpose the enlargement frame on a live view display from a start of the live view display, and the photometry unit is capable of increasing a degree of photometric weighting in the range corresponding to the enlargement frame relative to a degree of photometric weighting in another range and performing photometry of the subject.

13 Claims, 5 Drawing Sheets

AF (ONE POINT AF)

MF

ENLARGED IMAGE

ENLARGED IMAGE

IMAGE CAPTURING APPARATUS FOR PHOTOMETRY, CONTROL METHOD, AND STORAGE MEDIUM

BACKGROUND

Field of the Disclosure

A present exemplary embodiment relates to an image capturing apparatus capable of changing a degree of photometric weighting, a control method of the image capturing apparatus, and a storage medium.

Description of the Related Art

Interchangeable-lens type image capturing apparatuses can capture a wide-angle image by using an interchangeable lens equipped with an optical system capable of capturing an image at a wider angle than a general image capturing range. A wide-angle image captured with such an interchangeable lens can be used for Virtual Reality (hereinafter referred to as VR), Mixed Reality (hereinafter referred to as MR), and the like. For example, Japanese Patent Application Laid-Open No. 2001-188310 discusses a technique for a hardware configuration in which two objective systems separately arranged side-by-side on the left and right are employed for an optical system for a three-dimensional (3D) image capturing apparatus, and a distance measurement unit and a photometry unit are arranged between the two objective systems.

As a photometric method in conventional image capturing apparatuses, evaluation photometry is known as a photometric method in which a degree of photometric weighting in a range to be focused (focus measuring frame) is increased relative to a degree of photometric weighting in the other region in the entire image capturing range. In general, it is highly possible that a subject brought into focus by focus control is a main subject intended by a photographer (user). Thus, the degree of photometric weighting in a photometric frame is adjusted to be relatively higher than the degree of photometric weighting in the other range by using the evaluation photometry described above, whereby an image with an appropriate brightness intended by the user can be acquired. Japanese Patent Application Laid-Open No. 2001-188310 discusses an arrangement of a distance measurement unit and a photometry unit in an optical system for a 3D image capturing apparatus.

However, some interchangeable lenses are not compatible with automatic focus adjustment (AF) of an image capturing apparatus. Particularly, because interchangeable lenses that acquire wide-angle images for VR or MR as described above adjust a depth of field to capture an image having a wide image capturing range with a uniform depth of field, automatically adjusting a focus by the image capturing apparatus is difficult to be performed. Consequently, in the use of such a wide-angle interchangeable lens, the AF of the image capturing apparatus is often not available, and only manual focus adjustment (MF) by the user can be used in many cases.

Particularly, in a case where a wide-angle interchangeable lens and a non-wide-angle interchangeable lens having a normal image capturing range are used for the same image capturing apparatus and the lenses are exchanged as necessary, there may be an unnatural difference in brightness between images captured using the wide-angle interchangeable lens and images captured using the non-wide-angle interchangeable lens.

SUMMARY

In order to address the issues described above, a present exemplary embodiment is directed to providing an image capturing apparatus capable of preventing an image from having an unnatural brightness by a photometric operation even in a case where a user manually adjusts the focus during image capturing using a wide-angle lens.

According to an aspect of the present disclosure, an image capturing apparatus, including an image capturing unit, on which a first interchangeable lens and a second interchangeable lens different from the first interchangeable lens are able to be attached, includes at least one processor and memory holding a program which makes the processor function as a photometry unit configured to perform photometry of a subject, based on an image acquired by the image capturing unit, and a control unit configured to perform control to display an enlargement frame on a display unit in a state where the image acquired by the image capturing unit is displayed on the display unit, wherein the second interchangeable lens includes a first optical unit and a second optical unit, the first optical unit and the second optical unit being configured to guide a light flux from the subject to the image capturing unit through respective optical paths, wherein the enlargement frame corresponds to a range for an enlargement display of an image included in the enlargement frame, the enlargement display being performed on the display unit in response to an instruction from a user, wherein in a state where the second interchangeable lens is mounted on the image capturing apparatus, the control unit performs control to superimpose the enlargement frame on a live view display from a start of the live view display in which images acquired by the image capturing unit are consecutively displayed, and wherein in a state where the second interchangeable lens is mounted on the image capturing apparatus, the photometry unit increases a degree of photometric weighting in the range corresponding to the enlargement frame relative to a degree of photometric weighting in another range and performs photometry of the subject.

According to another aspect of the present disclosure, an image capturing apparatus including an image capturing unit, and a first optical unit and a second optical unit, the first optical unit and the second optical unit being configured to guide a light flux from a subject to the image capturing unit through respective optical paths, the image capturing apparatus includes at least one processor and memory holding a program which makes the processor function as a photometry unit configured to perform photometry of the subject, based on an image acquired by the image capturing unit, and a control unit configured to perform control to display an enlargement frame on a display unit in a state where the image acquired by the image capturing unit is displayed on the display unit, wherein the enlargement frame corresponds to a range for an enlargement display of an image included in the enlargement frame, the enlargement display being performed on the display unit in response to an instruction from a user, wherein the control unit performs control to superimpose the enlargement frame on a live view display from a start of the live view display in which images acquired by the image capturing unit are consecutively displayed, and wherein, in a case where the enlargement frame is displayed on the display unit, the photometry unit is capable of increasing a degree of photometric weighting in the range corresponding to the enlargement frame relative to a degree of photometric weighting in another range and performing photometry of the subject.

According to yet another aspect of the present disclosure, a control method of an image capturing apparatus, including an image capturing unit, on which a first interchangeable lens and a second interchangeable lens different from the first interchangeable lens are able to be attached, includes performing photometry of a subject, based on an image acquired by the image capturing unit, and performing control to display an enlargement frame on a display unit in a state where the image acquired by the image capturing unit is displayed on the display unit, wherein the second interchangeable lens includes a first optical unit and a second optical unit, the first optical unit and the second optical unit being configured to guide a light flux of the subject to the image capturing unit through respective optical paths, wherein the enlargement frame corresponds to a range for an enlargement display of an image included in the enlargement frame, the enlargement display being performed on the display unit in response to an instruction from a user, wherein in a state where the second interchangeable lens is mounted on the image capturing apparatus, the performing control includes superimposing the enlargement frame on a live view display from a start of the live view display in which images acquired by the image capturing unit are consecutively displayed, and wherein in a state where the second interchangeable lens is mounted on the image capturing apparatus, the performing photometry includes increasing a degree of photometric weighting in the range corresponding to the enlargement frame relative to a degree of photometric weighting in another range and performing photometry of the subject.

Further features of various embodiments will become apparent from the following description of exemplary embodiments with reference to the attached drawings.

DESCRIPTION OF THE EMBODIMENTS (Basic Configuration of Digital Camera 1)

Figure 1:
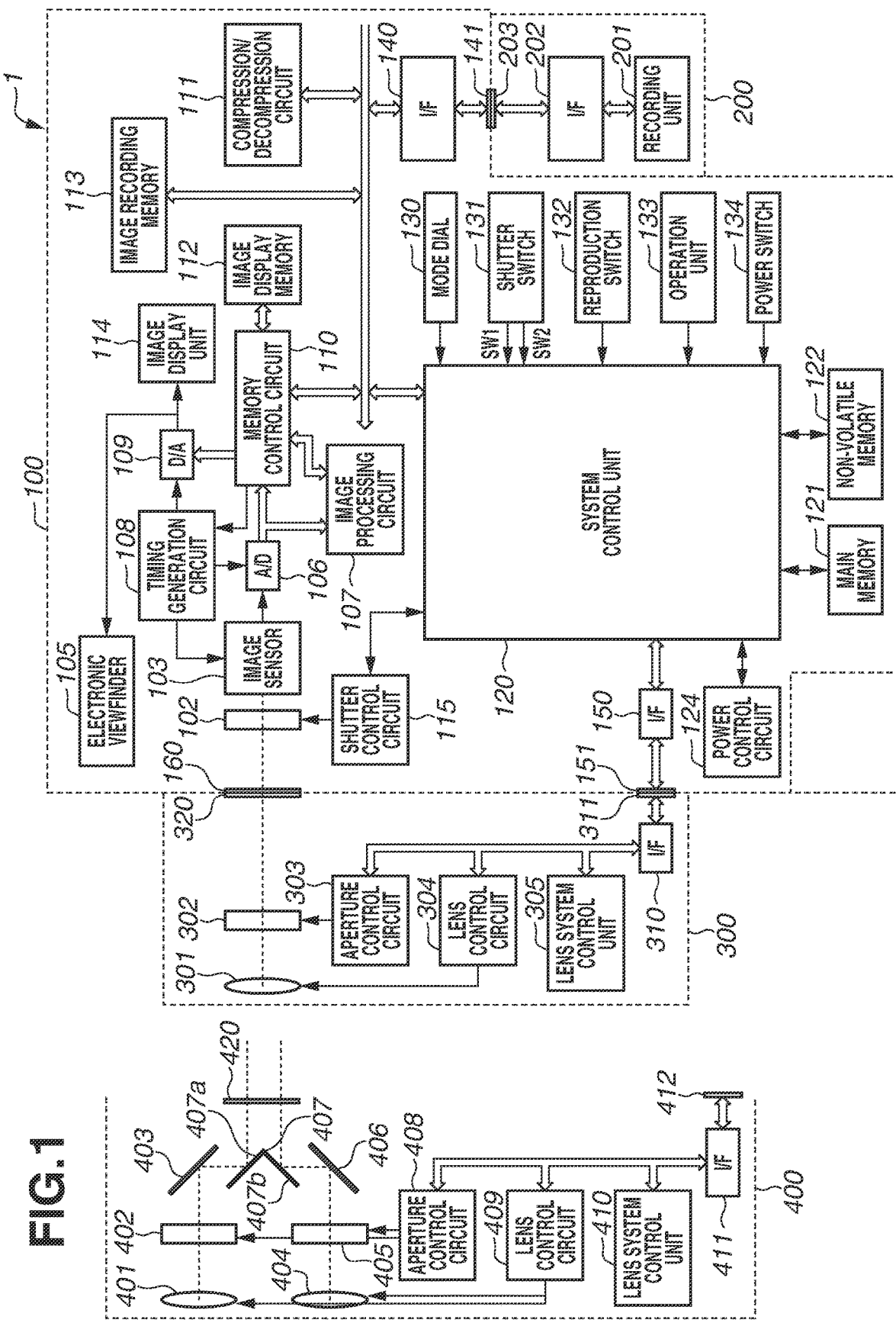
FIG. 1 is a block diagram illustrating a configuration example of a digital camera (hereinafter, simply referred to as a camera) as a first exemplary embodiment of an image capturing apparatus.

Hereinafter, a first exemplary embodiment will be described with reference to the accompanying drawings. FIG. 1 is a block diagram illustrating an example of a configuration of a digital camera (hereinafter, simply referred to as a camera) 1 as a first exemplary embodiment of an image capturing apparatus.

One or more of the functional blocks illustrated in FIG. 1 may be achieved by hardware, such as an application specific integrated circuit (ASIC) or a programmable logic array (PLA), or by a programmable processor, such as a central processing unit (CPU) or a microprocessor unit (MPU), executing software.

The functional blocks may also be achieved by a combination of software and hardware.

Thus, in the description below, even if different functional blocks are described as main bodies of respective operations, the operations can be achieved by the same hardware as a main body. While, as illustrated in FIG. 1, a camera 1 according to the present exemplary embodiment is a so-called interchangeable-lens type image capturing apparatus including a camera unit 100, an external recording medium 200, and a lens unit 300 or a lens unit 400, the camera 1 is not limited to the configuration. For example, the camera unit 100 and the lens unit 400 can be integrally configured. Hereinafter, the description about the basic configuration of the camera 1 will be given using a case where the lens unit 300 is mounted on the camera unit 100.

A shutter 102 is a light-shielding member for opening and shielding an optical path between the lens unit 300 or the lens unit 400 and an imaging sensor 103.

The imaging sensor 103 is a charge accumulation type solid-state image capturing element, such as a charge coupled device (CCD) or a complementary metal oxide semiconductor (CMOS) sensor, and is an image capturing unit for generating analog image data by photoelectrically converting (capturing an image of) an incident light flux from a subject via the lens unit 300.

An electronic viewfinder 105 is an electronic finder employing, for example, a thin film transistor drive type liquid crystal display device (TFT type LCD), an organic electroluminescence element (organic EL element), or the like, by which a user can check an optical image of the subject.

An analog/digital (A/D) conversion unit 106 is a conversion unit for converting analog image data output from the imaging sensor 103 into digital image data.

An image processing circuit 107 is an image processing unit for performing various processing, such as white balance adjustment processing and tone processing, on the digital image data output from the A/D conversion unit 106.

A timing generation circuit 108 is a timing signal generation unit for generating a signal (a control signal, such as a clock signal) to operate the imaging sensor 103, the A/D conversion unit 106, a digital/analog (D/A) conversion unit 109 described below, and the like.

The timing generation circuit 108 can control an accumulation of electric charge in the imaging sensor 103 by controlling a reset timing of an accumulated charge in the imaging sensor 103.

The timing generation circuit 108 is controlled by a system control unit 120 described below.

A memory control circuit 110 is a memory control unit for controlling the A/D conversion unit 106, the image processing circuit 107, the D/A conversion unit 109, and a compression/decompression circuit 111, and controls operation to write acquired image data in an image display memory 112 or an image recording memory 113.

An image display unit 114 is a display unit employing, for example, a TFT type LCD, an organic EL element, or the like, similarly to the electronic viewfinder 105 described above.

Display digital image data written in the image display memory 112 is displayed on the electronic viewfinder 105 and/or the image display unit 114 after being converted to analog image data for display by the D/A conversion unit 109.

The image recording memory 113 is a recording unit for storing image data acquired by capturing an image of a subject, and has a sufficient storage capacity for storing a predetermined amount of still image data and moving image data. The image recording memory 113 may also be used as a work area of the system control unit 120 described below.

The compression/decompression circuit 111 is a compression/decompression unit for reading image data stored in the image recording memory 113 and compresses or decompresses the image data according to a predetermined image compression method or image decompression method corresponding to a purpose.

A shutter control circuit 115 is a shutter control unit for controlling an operation of the shutter 102. Operation control of the shutter 102 is performed based on a photometry result, of a subject, calculated by the system control unit 120. The shutter 102 can be configured to be controlled in conjunction with control of an aperture 302 described below.

The system control unit 120 is a system control unit for comprehensively controlling operation of the camera 1. The system control unit 120 also serves as an exposure control unit for controlling exposure and as a focus control unit for focus control in accordance with focus detection results, based on image data acquired by the imaging sensor 103 as described above.

The system control unit 120 serving as the exposure control unit can change parameters, such as an aperture value for an opening rate of the aperture 302, a charge accumulation time of the imaging sensor 103 corresponding to a shutter speed, and an image capturing sensitivity for an analog gain and digital gain amount. The system control unit 120 performs photometric operations based on the image data acquired by the imaging sensor 103, acquires a luminance value (photometry result) of the image data, and controls an exposure by adjusting the above-described parameters to capture an image with an appropriate exposure according to the luminance value. The system control unit 120 can control time information relating to, for example, a timer function for capturing an image, an imaging interval, and a current time by using a system clock (not illustrated) or the like.

The system control unit 120 serving as the focus control unit acquires an evaluation value for focus detection, based on image data acquired by the imaging sensor 103, and executes focus control by adjusting a position of the focusing lens included in the lens unit, based on the evaluation value. The evaluation value for the focus detection can be a value calculated based on contrast information of the image data or a defocus amount.

A main memory 121 is a recording unit in which various data for an operation of the camera 1, such as information (a program diagram according to table data or the like) for an exposure (appropriate exposure) with respect to a luminance value. A non-volatile memory 122 is a storage unit, such as an electrically erasable and programmable read only memory (EEPROM) represented by a flash memory or the like, capable of electrically erasing and storing data.

Each component 130-134 described below is an operating unit for inputting various types of operation instructions to the system control unit 120, and includes operating members, such as a button, a switch, a dial, and a touch panel. In addition to the operating members, a line-of-sight input unit, a voice input unit, or the like can also be employed.

A mode dial 130 is an operation member for selecting and setting an image capturing mode from among a plurality of image capturing modes available in the camera unit 100. On the camera 1, a user can select and set a still image mode in which an image is captured to acquire a still image and a moving image mode in which a moving image is recorded. In either mode, a so-called live view display is performed. In the live view display, a plurality of image data acquired by continuously executing charge accumulation (capturing an image) using the imaging sensor 103 is consecutively displayed on the electronic viewfinder 105 or the image display unit 114.

On the camera 1 according to the present exemplary embodiment, the user can further select and set a mode from among modes individually settable for the still image mode and the moving image mode described above. For example, on the camera 1, the user can select and set a mode from among an automatic mode (A), a program mode (P), a shutter speed priority mode (Tv), an aperture priority mode (Av), a manual mode (M), and the like for each of the still image mode and the moving image mode.

In each mode, a photometry mode for a calculation method to calculate a photometric value (luminance value) of a subject can be set. Examples of selectable photometry modes (photometric methods) according to the present exemplary embodiment include evaluation photometry or center-weighted photometry in which the brightness of an entire image is evaluated with increased weighting for a subject area or any range of the entire image, partial photometry or spot photometry in which a part of the entire image is evaluated, and the like.

A shutter switch 131 is an operation member for receiving an instruction to start an image capturing preparation operation or an image capturing operation. In the present exemplary embodiment, a switch (SW) 1 is turned ON in response to a first stroke (for example, half depression) performed on the shutter switch 131. When the SW1 is turned ON, a start of an image capturing preparation operation is instructed, and the system control unit 120 starts focus control, exposure control, automatic white balance (AWB) processing, and the like. A SW2 is turned ON in response to a second stroke (for example, full depression) performed on the shutter switch 131. When the SW2 is turned ON, a start of an image capturing operation is instructed, and the system control unit 120 starts exposure processing and recording processing for the charge accumulation (image capturing) using the imaging sensor 103.

In image capturing (exposure) processing, a signal read from the imaging sensor 103 is written to the image recording memory 113 as image data via the A/D conversion unit 106 and the memory control circuit 110, in accordance with an instruction from the system control unit 120. Then, in accordance with an instruction from the system control unit 120, development processing based on various operations in the image processing circuit 107 and the memory control circuit 110 is executed on the image data, and the developed image data is written to the image recording memory 113.

In the recording processing, the developed image data read from the image recording memory 113 is compressed by the compression/decompression circuit 111 in accordance with an instruction from the system control unit 120. After that, in accordance with an instruction from the system control unit 120, the image data after the compression processing is written to a recording unit 201 of the external recording medium 200 via a first camera interface (I/F) 140, a first camera connector 141, a media connector 203, and a media I/F 202.

A reproduction switch 132 is an operation member for receiving an instruction to start reproduction processing in which acquired image data is read from the image recording memory 113 or the external recording medium 200 and displayed on the image display unit 114.

An operation unit 133 is an operation member for various settings relating to menu display and image capturing, and various settings for reproduction. For example, in the camera 1 according to the present exemplary embodiment, ON/OFF of an enlargement display of a subject during a live view display can be switched by an operation performed on the operation unit 133. In a method of an enlargement display of a subject, a focus measuring frame is superimposed on the live view display during AF, and an enlargement display of a certain range is performed in response to an AF ON instruction, such as an operation performed on the SW1. During MF, an enlargement frame is superimposed on the live view display in response to a first operation performed on the operation unit 133, and an enlargement display of a certain range is performed in accordance with the enlargement frame in response to a second operation performed on the operation unit 133. The size of the enlargement frame and the relative position of the enlargement frame with respect to the entire screen are also adjustable by the operation unit 133.

A power switch 134 is an operation member for switching ON/OFF of a power supply from a power supply unit (battery) (not illustrated) to each component of the camera 1. The user can switch ON/OFF of a power supply not only to the camera unit 100 but also to various external devices, such as each lens unit connected to the camera unit 100 and the external recording medium 200, by operating the power switch 134.

A power control circuit 124 is a power control unit including a battery detecting circuit, a direct current-direct current (DC-DC) converter, a switch circuit for switching an energization block, and the like. The power control circuit 124 detects whether a battery is installed, a type of battery, and a remaining battery level, based on an instruction from the system control unit 120 in accordance with an operation performed on the power switch 134, and supplies required voltage for a required period to each component of the camera 1.

A second camera I/F 150 provided in a camera mount section 160 is an interface for connecting the camera unit 100 and the lens unit 300. A second camera connector 151 is a connection unit for electrically connecting the camera unit 100 and the lens unit 300 via a lens connector 311 and a lens I/F 310. The second camera connector 151 transmits a control signal, a status signal, a data signal, or the like, between the camera unit 100 and the lens unit 300 or the lens unit 400, and supplies electric currents of various types of voltages. When the lens unit 400 is connected to the second camera I/F 150, the second camera connector 151 serves as a connection unit for electrically connecting the camera unit 100 and the lens unit 400 via a lens connector 412 and a lens I/F 411. The second camera connector 151 can be configured to perform not only electric communication but also optical communication, voice communication, and the like.

The external recording medium 200 is an external recording device, such as a memory card and a hard disk. The external recording medium 200 includes the media I/F 202 for the recording unit 201 including a semiconductor memory or a magnetic disk and the camera unit 100, and the media connector 203 for connecting to the camera unit 100.

The lens unit 300 is an optical device (first interchangeable lens) detachable from the camera unit 100. The lens unit 300 is a so-called single-lens interchangeable lens that guides an incident light flux from a subject from the lens unit to the camera 1 through a single optical path.

A lens mount section 320 is engageable with the camera mount section 160 and serves as a connection unit for mechanically attaching and detaching the lens unit 300 to and from the camera unit 100. A so-called bayonet connection method is used for attachment and detachment between the lens mount section 320 and the camera mount section 160, but a different method can be used for the attachment and detachment between the lens unit 300 and the camera unit 100.

The lens connector 311 that electrically connects the lens unit 300 and the camera unit 100 is provided inside the lens mount section 320. Via the lens connector 311, control signals, status signals, data signals, and the like, and electric currents of various types of voltages are transmitted and received and supplied between the lens unit 300 and the camera unit 100. The lens connector 311 can be configured to perform not only electric communication but also optical communication, voice communication, and the like.

An image capturing lens group 301 is an optical member including a focus lens, a zoom lens, a shift lens, and the like. The aperture 302 is a light amount adjustment member for adjusting a light amount of a light flux from a subject that is incident on the imaging sensor 103 after passing through the image capturing lens group 301. An aperture control circuit 303 is an aperture control unit that controls an open area amount of the aperture 302, based on an instruction from the system control unit 120. The system control unit 120 instructs the aperture control circuit 303 to change the aperture diameter of the aperture 302 to adjust the open area amount to an amount corresponding to a target aperture value. The aperture diameter of the aperture 302 in the changing operation is consecutively detected by mutual communication between the lens unit 300 and the camera unit 100. The system control unit 120 ends the changing operation for the aperture diameter of the aperture 302 when the aperture diameter of the aperture 302 reaches the aperture diameter corresponding to the target aperture value.

A lens control circuit 304 is a lens drive control unit for controlling an operation (drive) of the image capturing lens group 301. The lens control circuit 304 can detect a lens position (focus position) of the focus lens, and information regarding the detected lens position is transmitted to a camera unit 100 side.

A lens system control unit 305 is a lens control unit for comprehensively controlling the lens unit 300. The lens system control unit 305 includes a CPU (not illustrated), a volatile memory (not illustrated), and a non-volatile memory (not illustrated), and the volatile memory stores constants, variables, programs, and the like, for an operation. The non-volatile memory stores identification information, such as a unique number; management information; functional information, such as a maximum aperture value, a minimum aperture value, and a focal length; and the like, regarding the lens unit 300.

The lens unit 400 is an optical device (second interchangeable lens) detachable from the camera unit 100. The lens unit 400 is a so-called dual-lens interchangeable lens that guides an incident light flux from a subject from the lens unit 400 to the camera 1 through two different optical paths. The different optical paths included in the lens unit 400 are a first optical unit A and a second optical unit B which are independent of each other. The first optical unit A includes a first image capturing lens group 401, a first aperture 402, a first reflecting mirror 403 and a reflecting surface 407a of a third reflecting mirror 407, and a third image capturing lens group (not illustrated). The second optical unit B includes a second image capturing lens group 404, a second aperture 405, a second reflecting mirror 406, a reflecting surface 407b of the third reflecting mirror 407, and a fourth image capturing lens group (not illustrated). The third and fourth image capturing lens groups are arranged in an optical path between the third reflecting mirror 407 and a lens mount unit 420.

The two independent lens units described above can guide a respective light flux of two light fluxes from the subject having a parallax to the inside of the camera 1, and an image is formed on an image capturing plane of the imaging sensor 103. Consequently, in the camera 1 with the lens unit 400 according to the present exemplary embodiment, image data having two different imaging regions (image regions) with a parallax in one image is output. Image data having the two image regions described above is divided into each region, to acquire two sets of image data having a parallax.

Although not described in detail in the present exemplary embodiment, image data obtained by appropriately converting and correcting a plurality of image data having a parallax acquired by the method described above can be used as image data for MR or VR. Thus, by displaying the image data acquired by the camera 1 with the lens unit 400 on a head-mounted display or the like equipped with a display unit corresponding to each of the user's left and right eyes, the user can view VR images or MR images.

The lens mount unit 420 is engageable with the camera mount section 160 and serves as a connection unit for mechanically attaching and detaching the lens unit 400 to and from the camera unit 100. A so-called bayonet connection method is used for attachment and detachment between the lens mount unit 420 and the camera mount section 160, but a different method can be used for the attachment and detachment between the lens unit 400 and the camera unit 100.

The lens connector 412 that electrically connects the lens unit 400 and the camera unit 100 is provided inside the lens mount unit 420. Via the lens connector 412, control signals, status signals, data signals, and the like, and electric currents of various types of voltages are transmitted and received and supplied between the lens unit 400 and the camera unit 100. The lens connector 412 can be configured to perform not only electric communication but also optical communication, voice communication, and the like.

The first image capturing lens group 401 and the second image capturing lens group 404 described above are each provided with an optical member including a focus lens, a zoom lens, a shift lens, and the like, and each of the first and second image capturing lens groups 401 and 404 has a different optical axis. While, the first and second image capturing lens groups 401 and 404 are optical units each having a field angle of the lens exceeding 190 degrees°, the field angle of the lens is not limited to the angle exceeding 190 degrees as long as the first and second image capturing lens groups 401 and 404 have the field angle of the lens (focal length) at which a wide-angle image can be acquired. For example, it may be desirable that the field angle of the lens of the lens unit 400 is 180 degrees or more, and is at least wider than the field angle of the lens of the lens unit 300.

The first aperture 402 and the second aperture 405 are light amount adjustment members for adjusting the light amount of the light flux from the subject incident on the imaging sensor 103 via the first image capturing lens group 401 and the second image capturing lens group 404. An aperture control circuit 408 is an aperture control unit for controlling the open area amounts of the first aperture 402 and the second aperture 405, based on an instruction from the system control unit 120, and controls driving of each of the first and second apertures 402 and 405 to adjust the aperture amount to an amount corresponding to the target aperture value. Information regarding the aperture diameters of the first and second apertures 402 and 405 is consecutively detected by mutual communication between the lens unit 400 and the camera unit 100.

The first reflecting mirror 403, the second reflecting mirror 406, and the third reflecting mirror 407 are optical members for reflecting the light flux having passed through a corresponding one of the first and second image capturing lens groups 401 and 404, and guide an optical image of a subject to the imaging sensor 103 provided inside the camera unit 100.

A lens control circuit 409 is a lens drive control unit that controls driving of the first and second image capturing lens groups 401 and 404, based on an instruction from the system control unit 120. The lens control circuit 409 can detect a lens position (focus position) of the focus lens provided in each of the first and second image capturing lens groups 401 and 404, and information regarding the detected lens positions can be transmitted to the camera unit 100.

A lens system control unit 410 is a lens control unit that comprehensively controls an operation of the lens unit 400. The lens system control unit 410 includes a CPU (not illustrated), a volatile memory (not illustrated), and a non-volatile memory (not illustrated), and the volatile memory stores constants, variables, programs, and the like for an operation. The basic configuration of each of the components included in the camera 1 has been described above.

(Details of Image Capturing Preparation Processing)

Figure 2:
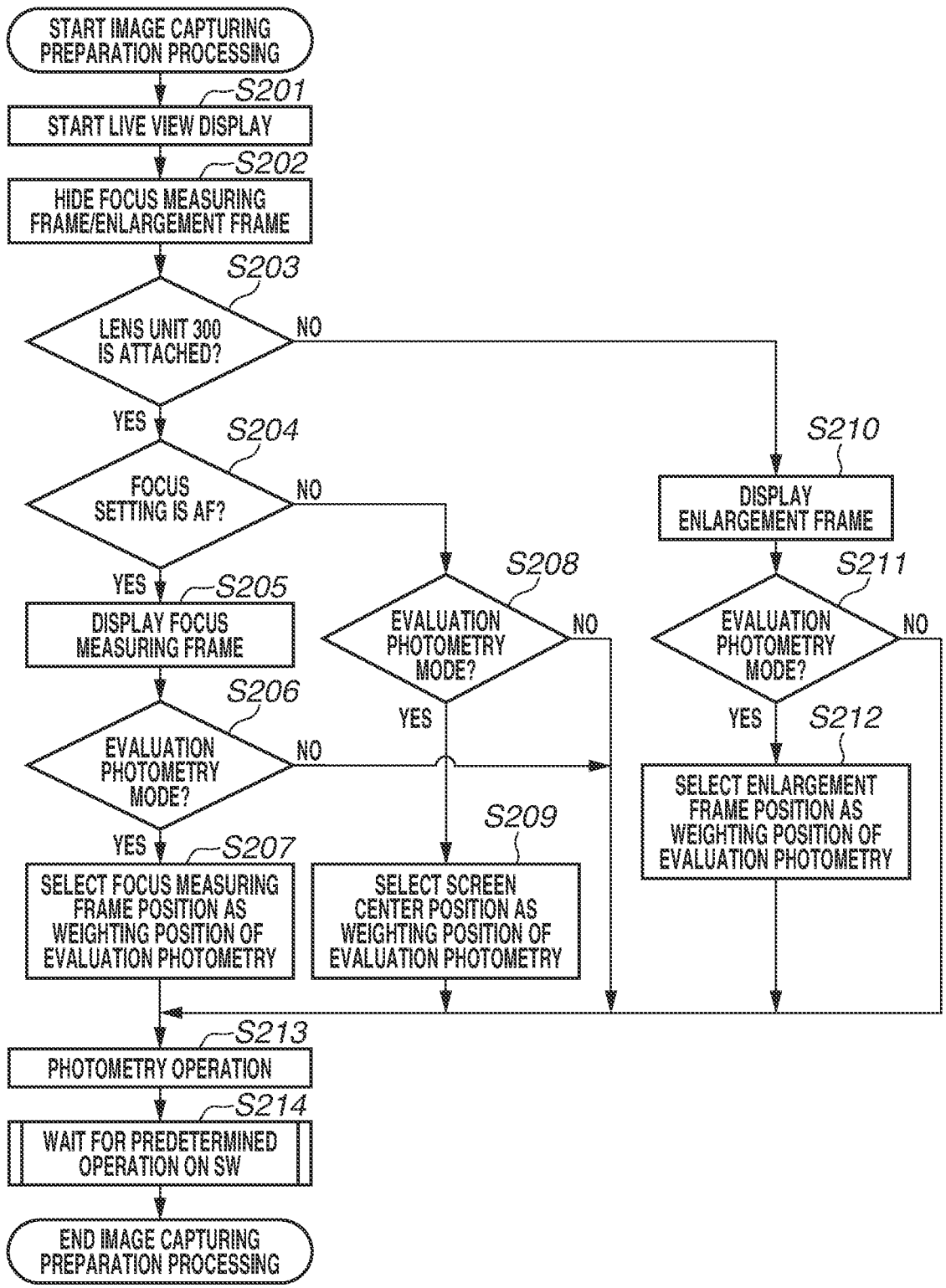
FIG. 2 is a flowchart illustrating image capturing preparation processing according to the first exemplary embodiment.

Image capturing preparation processing in a case where various types of interchangeable lenses are used for the camera unit 100 will be described below with reference to FIG. 2. FIG. 2 is a flowchart illustrating the image capturing preparation processing according to the first exemplary embodiment.

When the image capturing preparation processing is started in response to an instruction (power ON the camera 1, the image display unit 114, or the like) to start a live view display, in step S201, the system control unit 120 starts a live view display. In step S202, the system control unit 120 performs control to hide the focus measuring frame and/or the enlargement frame superimposed on the live view display. For example, in a case where the user can switch the image display on the image display unit 114 between ON and OFF, the system control unit 120 performs control to prevent contents previously displayed from being displayed when the image display on the image display unit 114 is changed from the non-display state (OFF) to the display state (ON).

Next, in step S203, the system control unit 120 determines a type of an interchangeable lens mounted on the camera unit 100. More specifically, in the present exemplary embodiment, in step S203, the system control unit 120 determines whether the lens unit 300 is mounted on the camera unit 100 or the lens unit 400 is mounted on the camera unit 100. While, in the present exemplary embodiment, the determination is made based on a change in voltage levels, or the like, of the second camera connector 151 and the corresponding connector of each lens unit according to the connection status of the connector, the type determination can be made based on data communication. The processing of step S203 can determine whether a different lens unit is mounted, and in such a case, the lens unit is roughly classified to determine whether the lens unit is a single-lens interchangeable lens or a twin-lens interchangeable lens.

Figure 4A:
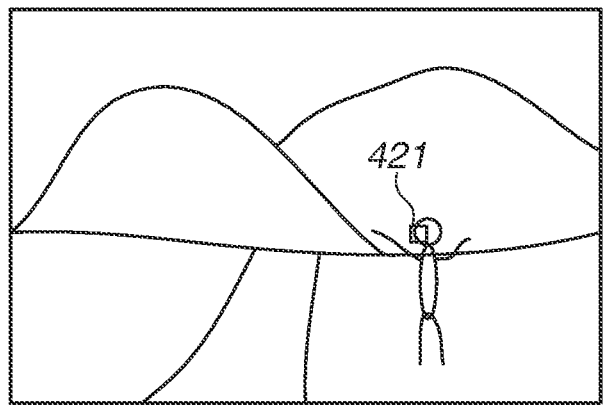
FIGS. 4A and 4B are diagrams illustrating examples of a display of a focus measuring frame and an enlargement frame.

In a case where the lens unit mounted on the camera unit 100 is the lens unit 300 (YES in step S203), the processing proceeds to step S204. In step S204, the system control unit 120 determines whether the focus setting (focus mode) is AF. In a case where the AF mode is set (YES in step S204), the processing proceeds to step S205. In step S205, the focus measuring frame is displayed in a superimposed manner on the live view display. By the processing of step S205, an AF frame 421 is displayed at any position designated by the user as illustrated in FIG. 4A. The position and the size of the focus measuring frame (AF frame) are determined based on the AF method selected in advance by the user and a position of the focus measuring frame designated by the user. In a case where a display of an enlarged image is designated when the focus setting is AF, the range corresponding to the focus measuring frame set by the user is enlarged and the live view display is performed for the enlarged range.

Figure 4B:
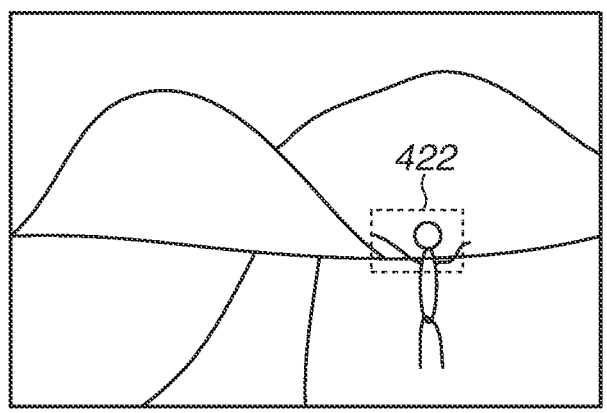
Figure 4C:
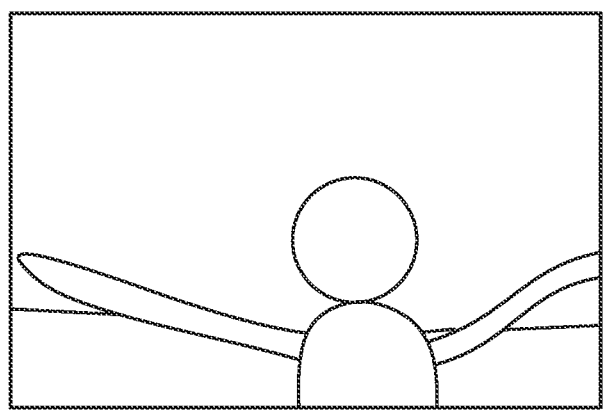
FIG. 4C is a diagram illustrating an enlarged image, in accordance with a focus setting according to the present exemplary embodiment.

FIGS. 4A and 4B are diagrams illustrating examples of display of the focus measuring frame and the enlargement frame and FIG. 4C is a diagram illustrating an enlarged image, in accordance with a focus setting according to the present exemplary embodiment. FIG. 4A illustrates an example case where the focus setting is AF and the live view display is performed with so-called one point AF in which an AF frame is set for any single point in the entire image (screen). FIG. 4B illustrates an example case where the focus setting is MF and the live view display is performed with an enlargement frame 422 displayed (set) in any range in the entire image (screen). FIG. 4C illustrates an example case where the focus setting is MF and the live view display of an enlarged image corresponding to the enlargement frame displayed in FIG. 4B is performed.

Next, in step S206, the system control unit 120 determines whether the currently set photometry mode is an evaluation photometry mode or another mode. In step S206, in a case where the system control unit 120 determines that the currently set photometry mode is the evaluation photometry mode (YES in step S206), the processing proceeds to step S207. In step S207, the focus measuring frame position is set as a weighting position for the photometric operation processing. In step S206, in a case where the system control unit 120 determines that the currently set photometry mode is a photometry mode other than the evaluation photometry mode (NO in step S206), the system control unit 120 does not change the weighting position for the photometric operation processing in this process. Then, the processing proceeds to step S213, and the system control unit 120 executes the photometric operation processing.

In the photometric operation processing according to the present exemplary embodiment, the entire image (screen) is divided into a plurality of blocks, and an average luminance value is calculated for each of the divided blocks. In this process, any known calculation unit to obtain a luminance value (photometric value) can be used. In the present exemplary embodiment, 1 brightness value (BV) according to the Additive System of Photographic Exposure (APEX) system is used as one stage of the luminance value (photometric value). The luminance value calculated for each block is multiplied by a predetermined degree of weighting (weighting coefficient) different for each photometry mode, and the average value of all the blocks is used as a representative luminance value of the image. For example, in a case where the degree of weighting for the photometric frame is increased relative to that in the other range in the evaluation photometry mode, the degree of weighting for the luminance value of the block corresponding to the photometric frame is increased. In each photometry mode, the degree of weighting in a range other than the range targeted for increase of the degree of weighting can be set to 0.

Next, in step S204, the system control unit 120 determines that the focus setting is MF (NO in step S204), the processing proceeds to step S208. In step S208, the system control unit 120 determines whether the currently set photometry mode is an evaluation photometry mode. The processing of step S208 is the same as that of step S206 described above, and thus, the redundant description will be omitted. In a case where the processing proceeds to step S208, unlike a case where the focus setting is AF, the focus measuring frame is not displayed. However, in a case where the user issues an instruction to display the enlargement frame, an enlargement frame 602 is displayed in a superimposed manner on the live view display as illustrated in FIG. 5B.

In a case where the lens unit 300 is mounted on the camera unit 100 according to the present exemplary embodiment, even when the focus setting is MF, the enlargement frame 422 is not displayed at a start of the live view display, and the enlargement frame 422 is displayed according to the instruction of the user. On the other hand, in a case where the lens unit 400 is mounted on the camera unit 100, the enlargement frame 422 is displayed in a superimposed manner on the live view display from the start of the live view display. This is because, with the lens unit 300, AF is available for the focus setting whereas, with the lens unit 400, only MF is available for the focus setting. In a case where both AF and MF are available for the focus setting, there is a risk that the user may confuse and erroneously recognize the focus measuring frame and the enlargement frame if display of the focus measuring frame and display of the enlargement frame is switched many times in response to switching of the focus setting.

On the other hand, in a case of a lens unit, such as the lens unit 400, with which AF is not available, the focus measuring frame is not displayed on the live view display, and thus, there is no risk of erroneously recognizing the focus measuring frame and the enlargement frame.

The camera 1 according to the present exemplary embodiment displays the enlargement frame 602 from the start of the live view display in a state in which the lens unit 400 is mounted, whereby it is possible to reduce the number of user operations for the display of the enlargement frame.

Returning to FIG. 2, in step S208, in a case where the system control unit 120 determines that the currently set photometry mode is the evaluation photometry mode (YES in step S208), the processing proceeds to step 209. In step S209, the system control unit 120 selects a center portion of the entire screen as the weighting position for the photometric operation processing.

In step S208, in a case where the system control unit 120 determines that the currently set photometry mode is a photometry mode other than the evaluation photometry mode (NO in step S208), the system control unit 120 does not change the weighting position for the photometric operation processing in this process. Then, in step S213, the system control unit 120 executes the photometric operation processing as described above.

Next, in step S214, the system control unit 120 executes standby processing until a predetermined switch operation, such as an image capturing instruction (SW2 is turned ON), is performed. In the present exemplary embodiment, by the processing of step S214, the system control unit 120 waits for a predetermined switch operation until a predetermined time elapses, and in a case where the predetermined time elapses without the switch being operated, the processing returns to step S203 and the subsequent processing is repeated. The method of the standby processing and to which step the processing is returned are not limited thereto, and any method and any processing procedure may be adopted. In the standby processing of step S214, in response to a determination that a predetermined switch has been operated, the image capturing preparation processing is terminated.

Next, a processing method in a case where it is determined in the processing of step S203 that the lens unit mounted on the camera unit 100 is the lens unit 400 (NO in step S203) will be described. In step S210, the system control unit 120 performs control to display the enlargement frame superimposed on the live view display.

Figure 5A:
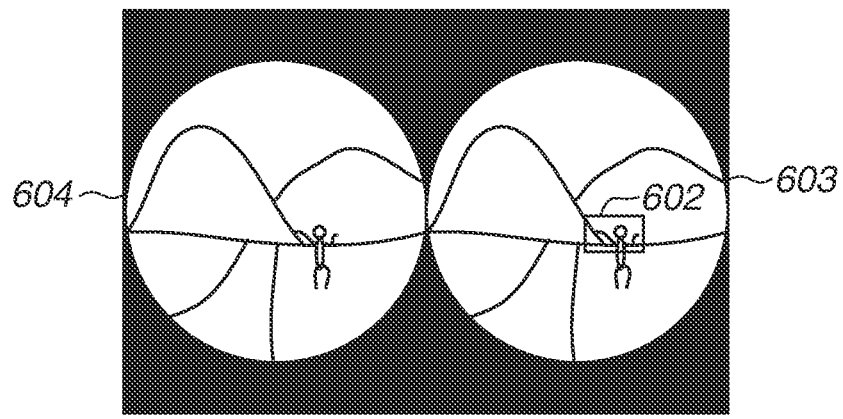
FIGS. 5A to 5C are diagrams illustrating examples of a live view display that is performed when the dual-lens interchangeable lens is mounted on a camera unit.
Figure 5B:
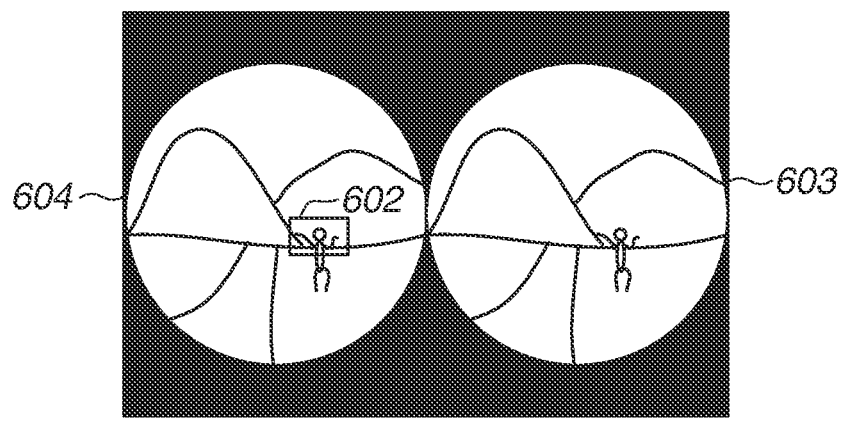
Figure 5C:
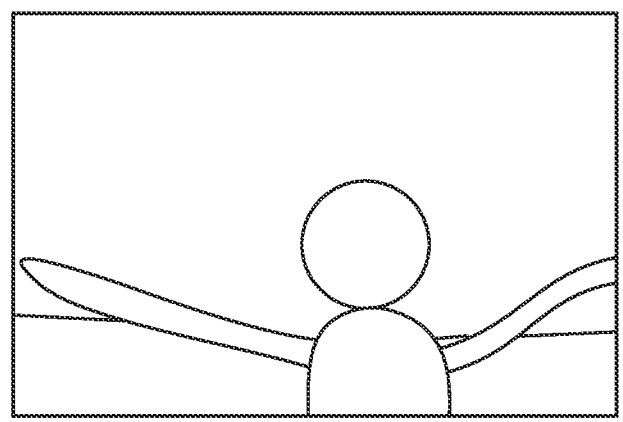

FIGS. 5A to 5C are diagrams illustrating a case where the live view display is performed when the lens unit 400 is mounted on the camera unit 100. FIGS. 5A and 5B illustrate a case where an enlargement frame 602 is displayed on the right side of the image and a case where an enlargement frame 602 is displayed on the left side, respectively. FIG. 5C illustrates an example case of an enlarged image of a state where the lens unit 400 is mounted on the camera unit 100.

As described above, the lens unit 400 includes the first optical unit A and the second optical unit B, each of which guides a light flux from a subject into the camera unit 100 through an independent optical path. Thus, as an image formed on the imaging sensor 103 via each optical unit, as illustrated in FIGS. 5A and 5B, separate image regions are displayed for each of the left and right regions of the image. In the present exemplary embodiment, an image region displayed on the right side of the image is referred to as a right side image region 603, and an image region displayed on the left side of the image is referred to as a left side image region 604. A parallax occurs between the right side and left side image regions 603 and 604 according to the difference between the optical axes of the first and second optical units A and B.

In the present exemplary embodiment, each of the right side image region 603 and the left side image region 604 displays a so-called circular fisheye image, but the display is not limited the circular fisheye image. Each of the right side and left side image regions 603 and 604 can display an equirectangular converted image obtained from the fisheye image.

As illustrated in FIG. 5A, when the live view display is started in a state where the lens unit 400 is mounted on the camera unit 100, the enlargement frame 602 is displayed in a superimposed manner on the right side image region 603. The user can freely move the position of the enlargement frame 602 by operating the operation unit 133 or the like. In the camera 1 according to the present exemplary embodiment, even when the enlargement frame 602 is in either the right side image region 603 or the left side image region 604, an enlarged live view image can be displayed as illustrated in FIG. 5C based on the position of the enlargement frame in each image.

Returning to FIG. 2, in step S211, the system control unit 120 determines whether the currently set photometry mode is an evaluation photometry mode.

The processing of step S211 is the same as that of step S206 described above, and thus, the redundant description will be omitted. In step S211, in a case where the system control unit 120 determines that the currently set photometry mode is the evaluation photometry mode (YES in step S211), the processing proceeds to step S212. In step S212, the system control unit 120 selects the enlargement frame position as the weighting position for the photometric operation processing. More specifically, in step S212, the system control unit 120 increases the degree of photometric weighting for the subject, corresponding to the enlargement frame being displayed in a superimposed manner on the live view display, relative to that in the other range. In step S211, in a case where the system control unit 120 determines that the currently set photometry mode is a photometry mode other than the evaluation photometry mode (NO in step S211), the system control unit 120 does not change the weighting position for the photometric operation processing in this process. Then, the processing proceeds to step S213, and the system control unit 120 executes the photometric operation processing as described above.

Figure 3:
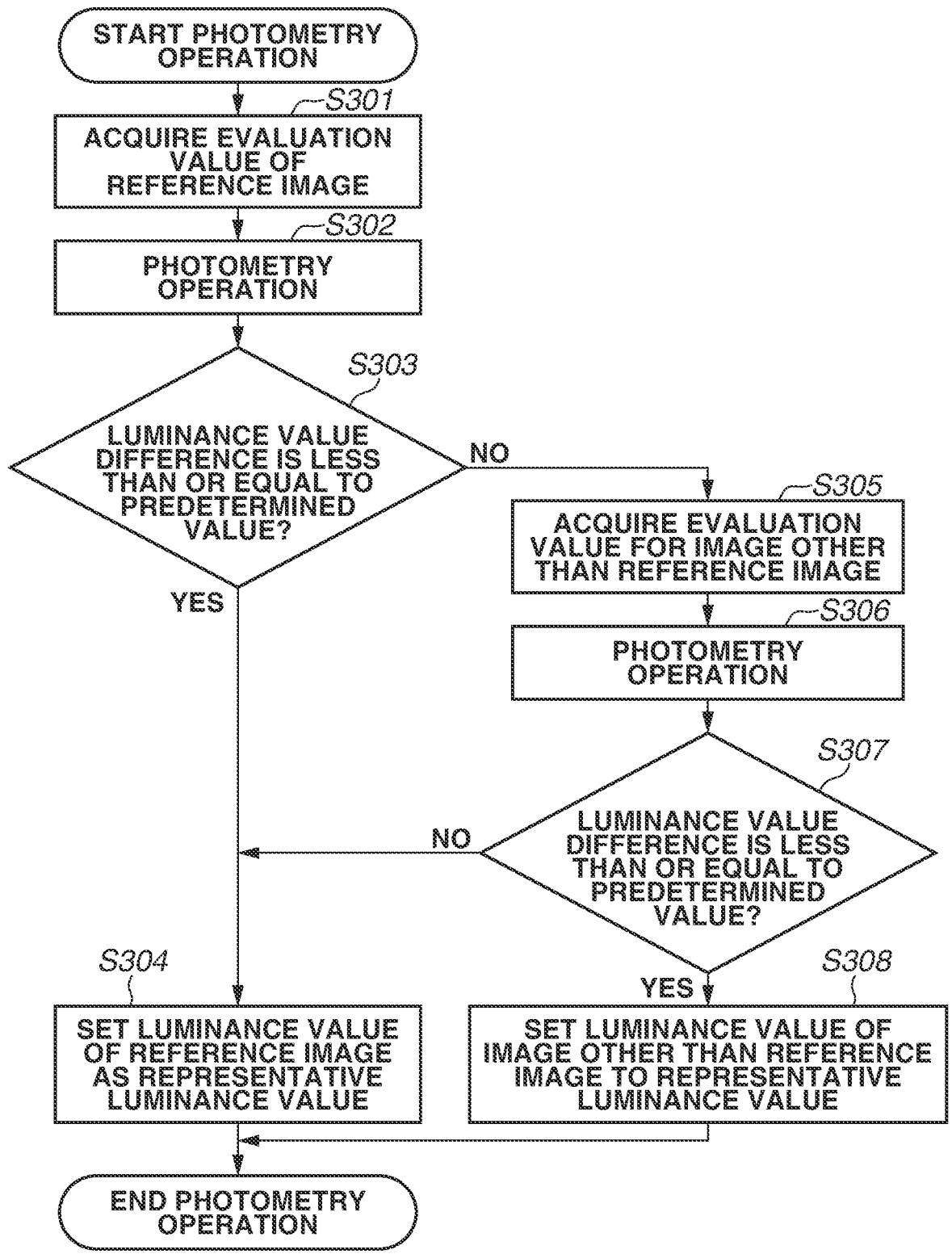
FIG. 3 is a flowchart illustrating photometric operation processing of a case where a dual-lens interchangeable lens unit according to the first exemplary embodiment is mounted on a camera unit.

In the photometric operation processing when the lens unit 400 is mounted on the camera unit 100, one of a right side image range and a left side image range of the two images is used. This will be described in more detail with reference to FIG. 3. FIG. 3 is a flowchart illustrating the photometric operation processing in a case where the lens unit 400 according to the first exemplary embodiment is mounted on the camera unit 100.

As illustrated in FIG. 3, when the photometric operation processing described above is started in a state where the lens unit 400 is mounted on the camera unit 100, in step S301, the system control unit 120 determines a reference image from among images in the right side image region and the left side image region. Then, an evaluation value to be used in the photometric operation processing is acquired based on the determined reference image. In step S302, a photometric operation is performed. While, in the present exemplary embodiment, the image in the right side image region 603 is used as the reference image, the reference image is not limited to the right side image region 603. The left side image region 604 can also be used as the reference image.

Next, in step S303, the system control unit 120 compares a luminance value (photometry result) of the subject obtained by a previous photometric operation and a luminance value (photometry result) of the subject obtained by the current photometric operation. In S303, in a case where the system control unit 120 determines that the difference between the previous and current luminance values is less than or equal to a predetermined value (YES in step S303), the processing proceeds to step S304. In a case where the system control unit 120 determines that the difference between the previous and current luminance values is larger than a predetermined value (NO in step S303), the processing proceeds to step S305. In a case where the previous luminance value to be compared is not recorded (such as a case of the first processing after the start of the photometric operation processing), the processing proceeds to step S304.

In step S304, the system control unit 120 sets the acquired luminance value obtained using the reference image as a representative luminance value in the current image capturing preparation processing, without performing a photometric operation again. On the other hand, in step S305, the system control unit 120 acquires an evaluation value to be used for the photometric operation processing from an image other than the reference image. In step S306, the system control unit 120 performs photometric operation. In the present exemplary embodiment, an image (region) not set as a reference image among the right side image region 603 and the left side image region 604 is used for the photometric operation in step S306.

In step S307, the system control unit 120 again compares the luminance value (photometry result) of the subject obtained by the previous photometric operation and a luminance value of the subject obtained by the photometric operation in step S306 performed based on an image other than the reference image. The result of the previous photometric operation in the processing of S307 is not the result of the processing of the immediately preceding step S302, but the same value as the previous photometric operation result used in the processing of step S303.

In step S307, in a case where the system control unit 120 determines that the difference between the previous and current luminance values is less than or equal to a predetermined value (YES in step S307), the processing proceeds to step S308. In a case where the system control unit 120 determines that the difference between the previous and current luminance values is larger than a predetermined value (NO in step S307), the processing proceeds to step S304. In step S308, the system control unit 120 sets the luminance value for an image other than the reference image obtained in the processing of step S306 as a representative luminance value in the current image capturing preparation processing.

As described above, in a case of acquiring an image using the lens unit 400, two image regions having a parallax can be acquired, and photometry results can be obtained for each of the two images by dividing image data of each of the two image regions and performing photometric operation. The camera 1 according to the present exemplary embodiment utilizes this feature to reduce an excessive change in luminance level in the live view display by performing photometric operation based on the image with the smaller luminance change of the two images with a parallax. The photometric operation processing when the image capturing preparation processing is executed using the lens unit 400 has been described above.

As described above, the camera 1 according to the present exemplary embodiment can acquire a wide-angle image, and even in a case of capturing an image of a subject with a lens not compatible with AF, it is possible to prevent acquiring of an image having an unnatural brightness, by performing evaluation photometry based on the enlargement frame. The camera 1 according to the present exemplary embodiment can automatically display an enlargement frame in a superimposed manner on the live view display when the lens unit 400 is mounted, unlike when the lens unit 300 having a normal field angle and compatible with AF is mounted. With this configuration, the camera 1 according to the present exemplary embodiment can perform evaluation photometry based on an enlargement frame, without the user operation for an instruction to display the enlargement frame, in a state where the lens unit 400 is mounted, and thus, usability can be improved and the brightness of the acquired image can be stabilized.

In the exemplary embodiment described above, the lens unit 400 has been described as a lens unit not compatible with AF, but the present exemplary embodiment is not limited thereto. For example, the lens unit 400 can be compatible with AF, and in such a case, when the focus setting is MF, the enlargement frame is automatically displayed in a superimposed manner on the live view display, and the photometric weighting is increased for the enlargement frame position.

While, in the exemplary embodiment described above, a range in which the degree of photometric weighting is increased is set according to the photometry mode set in the camera 1 with the lens unit 400, but the present exemplary embodiment is not limited to the configuration. For example, in a case where the lens unit 400 is mounted on the camera unit 100, the degree of photometric weighting in a range corresponding to the enlargement frame position is increased relative to the degree of photometric weighting in the other range regardless of the photometry mode. In such a case, the camera 1 can be configured such that a photometry mode other than the evaluation photometry mode cannot be selected.

While exemplary embodiments have been described above, some embodiments not limited to these exemplary embodiments, and various modifications and changes are possible within the range of the gist of the present disclosure. For example, while, in the exemplary embodiments described above, a digital camera has been described as an example of an image capturing apparatus for carrying out the present exemplary embodiment, the image capturing apparatus is not limited to a digital camera. For example, instead of a digital camera, an image capturing apparatus can be a portable device, such as a digital video camera and a smartphone, a wearable terminal, an in-vehicle camera, a security camera, and the like.

While, in the exemplary embodiments described above, an interchangeable lens type digital camera has been described as an example of an image capturing apparatus for carrying out the present exemplary embodiment, the image capturing apparatus can also be a so-called lens-integrated type digital camera. In such case, the camera 1 includes the optical system included in the lens unit 400.

While, in the exemplary embodiments described above, the overall operations of the image capturing apparatus are controlled by each of the components included in the image capturing apparatus operating in cooperation with each other centered on the system control unit 120, the exemplary embodiments are not limited to the configuration. For example, computer-executable instructions (e.g., a (computer) program) according to the procedure illustrated in each of the above-described drawings is stored in advance in a read only memory (ROM) area of the non-volatile memory 122 of the camera unit 100 or the like. Operations for the entire image capturing system can be controlled by a microprocessor, such as the system control unit 120, executing the instructions (e.g., program). As long as the instructions implement the function described above, the format of the instructions does not matter. The instructions can be an object code, a program executed by an interpreter, script data that is supplied to an operating system (OS), or the like. The recording medium for supplying the instructions can be, for example, a hard disk, a magnetic recording medium, such as a magnetic tape, or an optical/magneto-optical recording medium.

Other Embodiments

Some embodiments may also be embodied by processing in which computer-executable instructions that realize one or more functions according to the above-described exemplary embodiment are provided to a system or apparatus via a network or a storage medium, and one or more processors in a computer of the system or apparatus read and execute the computer-executable instructions. Some embodiments may also be embodied by a circuit (for example, an application-specific integrated circuit (ASIC)) that realizes one or more functions.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-163592, which was filed on Oct. 4, 2021 and which is hereby incorporated by reference herein in its entirety.

What is claimed is:

1. An image capturing apparatus, including an image capturing unit, on which a first interchangeable lens and a second interchangeable lens different from the first interchangeable lens are able to be attached, the image capturing apparatus comprising:
at least one processor and memory holding instructions which make the processor function as:
a photometry unit configured to perform photometry of a subject, based on an image acquired by the image capturing unit; and
a control unit configured to perform control to display an enlargement frame on a display unit in a state where the image acquired by the image capturing unit is displayed on the display unit,
wherein the second interchangeable lens includes a first optical unit and a second optical unit, the first optical unit and the second optical unit being configured to guide a light flux from the subject to the image capturing unit through respective optical paths,
wherein the enlargement frame corresponds to a range for an enlargement display of an image included in the enlargement frame, the enlargement display being performed on the display unit in response to an instruction from a user,
wherein in a state where the second interchangeable lens is mounted on the image capturing apparatus, the control unit performs control to superimpose the enlargement frame on a live view display from a start of the live view display in which images acquired by the image capturing unit are consecutively displayed, and
wherein in a state where the second interchangeable lens is mounted on the image capturing apparatus, the photometry unit increases a degree of photometric weighting in the range corresponding to the enlargement frame relative to a degree of photometric weighting in another range and performs photometry of the subject.

2. The image capturing apparatus according to claim 1, wherein the image capturing apparatus selects, as a photometric method, a first mode or a second mode different from the first mode,
wherein the first mode is a photometric method in which a degree of photometric weighting in a predetermined range in an entire image is increased relative to the degree of photometric weighting in the other range, and
wherein, in a case where the first mode is set in a state where the second interchangeable lens is mounted on the image capturing apparatus, the photometry unit increases the degree of photometric weighting in the range corresponding to the enlargement frame relative to the degree of photometric weighting in the other range and performs photometry of the subject.

3. The image capturing apparatus according to claim 1, wherein the second interchangeable lens is a lens with which automatic focus adjustment (AF) in focus setting is not settable, and
wherein the control unit performs control to superimpose the enlargement frame on a live view display from a start of the live view display in which images acquired by the image capturing unit are consecutively displayed, in response to the second interchangeable lens being mounted on the image capturing apparatus.

4. The image capturing apparatus according to claim 1, wherein, in a case where a focus setting is set to manual focus adjustment (MF) in a state where the second interchangeable lens is mounted on the image capturing apparatus, the photometry unit increases the degree of photometric weighting in the range corresponding to the enlargement frame relative to the degree of photometric weighting in the other range and performs photometry of the subject.

5. The image capturing apparatus according to claim 1, wherein the first interchangeable lens is a single-lens interchangeable lens,
wherein the second interchangeable lens is a dual-lens interchangeable lens, and
wherein, in a case where a focus setting is set to AF in a state where the first interchangeable lens is mounted on the image capturing apparatus, the photometry unit increases a degree of photometric weighting in a range corresponding to a focus measuring frame superimposed on an image displayed on the display unit relative to a degree of photometric weighting in the other range and performs photometry of the subject.

6. The image capturing apparatus according to claim 1, wherein, the image capturing unit performs image capturing of the subject in a state where the second interchangeable lens is mounted on the image capturing apparatus, to output image data of two different image capturing ranges with a parallax.

7. The image capturing apparatus according to claim 6, wherein in a case where the image data of the two different image capturing ranges is displayed in a live view display on the display unit, the photometry unit performs photometry of the subject based on one of the two different image capturing ranges.

8. The image capturing apparatus according to claim 1, wherein the second interchangeable lens has a field angle of 180° or more and the field angle is a wider than a field angle of the first interchangeable lens.

9. An image capturing apparatus comprising:
   an image capturing unit;
   a first optical unit and a second optical unit, the first optical unit and the second optical unit being configured to guide a light flux from a subject to the image capturing unit through respective optical paths; and
   at least one processor and memory holding a instructions which make the processor function as:
   a photometry unit configured to perform photometry of the subject, based on an image acquired by the image capturing unit; and
   a control unit configured to perform control to display an enlargement frame on a display unit in a state where the image acquired by the image capturing unit is displayed on the display unit,
   wherein the enlargement frame corresponds to a range for an enlargement display of an image included in the enlargement frame, the enlargement display being performed on the display unit in response to an instruction from a user,
   wherein the control unit performs control to superimpose the enlargement frame on a live view display from a start of the live view display in which images acquired by the image capturing unit are consecutively displayed, and
   wherein, in a case where the enlargement frame is displayed on the display unit, the photometry unit is capable of increasing a degree of photometric weighting in the range corresponding to the enlargement frame relative to a degree of photometric weighting in another range and performing photometry of the subject.

10. A control method of an image capturing apparatus, including an image capturing unit, on which a first interchangeable lens and a second interchangeable lens different from the first interchangeable lens are able to be attached, the control method comprising:
   performing photometry of a subject, based on an image acquired by the image capturing unit; and
   performing control to display an enlargement frame on a display unit in a state where the image acquired by the image capturing unit is displayed on the display unit,
   wherein the second interchangeable lens includes a first optical unit and a second optical unit, the first optical unit and the second optical unit being configured to guide a light flux of the subject to the image capturing unit through respective optical paths,
   wherein the enlargement frame corresponds to a range for an enlargement display of an image included in the enlargement frame, the enlargement display being performed on the display unit in response to an instruction from a user,
   wherein in a state where the second interchangeable lens is mounted on the image capturing apparatus, the performing control includes superimposing the enlargement frame on a live view display from a start of the live view display in which images acquired by the image capturing unit are consecutively displayed, and
   wherein in a state where the second interchangeable lens is mounted on the image capturing apparatus, the performing photometry includes increasing a degree of photometric weighting in the range corresponding to the enlargement frame relative to a degree of photometric weighting in another range and performing photometry of the subject.

11. A computer readable non-transitory storage medium that stores a program for causing a computer to execute the control method of an image capturing apparatus according to claim 10.

12. A control method of an image capturing apparatus including an image capturing unit, and a first optical unit and a second optical unit, the first optical unit and the second optical unit being configured to guide a light flux from a subject to the image capturing unit through respective optical paths, the control method comprising:
   performing photometry of the subject, based on an image acquired by the image capturing unit; and
   performing control to display an enlargement frame on a display unit in a state where the image acquired by the image capturing unit is displayed on the display unit,
   wherein the enlargement frame corresponds to a range for an enlargement display of an image included in the enlargement frame, the enlargement display being performed on the display unit in response to an instruction from a user,
   wherein the performing control includes superimposing the enlargement frame on a live view display from a start of the live view display in which images acquired by the image capturing unit are consecutively displayed, and
   wherein, in a case where the enlargement frame is displayed on the display unit, the performing photometry includes increasing a degree of photometric weighting in the range corresponding to the enlargement frame relative to a degree of photometric weighting in another range and performing photometry of the subject.

13. A computer readable non-transitory storage medium that stores a program for causing a computer to execute the control method of an image capturing apparatus according to claim 12.

* * * * *